United States Patent [19]

Nishibe et al.

[11] Patent Number: 5,030,899
[45] Date of Patent: Jul. 9, 1991

[54] WIPER CONTROL DEVICE

[75] Inventors: Yasushi Nishibe; Hitoshi Iwata; Masakata Kanbe, all of Aichi, Japan

[73] Assignee: Kabushiki Kaisha Tokai Rika Denki Seisakusho, Aichi, Japan

[21] Appl. No.: 523,360

[22] Filed: May 15, 1990

[30] Foreign Application Priority Data

May 16, 1989 [JP] Japan .................................. 1-123655

[51] Int. Cl.⁵ ............................................... B60S 1/02
[52] U.S. Cl. .............................. 318/444; 318/DIG. 2
[58] Field of Search ......... 318/434, 443, 444, DIG. 2; 15/250 C, 250.16, 250.17

[56] References Cited

U.S. PATENT DOCUMENTS 4,314,186 2/1982 Gille et al. ..................... 318/434
4,689,535 8/1987 Tsunoda et al. ......... 318/DIG. 2 X
4,731,566 3/1988 Takaishi .......................... 318/444

Primary Examiner—Bentsu Ro
Attorney, Agent, or Firm—Finnegan, Henderson, Farabow, Garrett and Dunner

[57] ABSTRACT

A wiper control device comprising a wiper driving motor, a wiper switch having a continuous mode, a stop mode position, and an intermittent mode position, a predetermined position stop switch for detecting whether a wiper is placed in a predetermined standby position or not, the stop switch is placed in a detection state when the wiper is moved to the predetermined standby position, a driving circuit for holding an operation thereof for each period until the predetermined position stop switch is placed in the detection state, a main semiconductor switching element for switching the wiper driving motor, the switching element being inserted in a powering path provided for the driving circuit when the wiper switch is set in the intermittent mode position, an interval control circuit for periodically starting an operation of the driving circuit, an auxiliary semiconductor switching element for turning on to short-circuit both terminals of the wiper driving motor when the operation of the driving circuit is suspended, a current detecting circuit for detecting a load current flowing in the main semiconductor switching element, a response circuit for outputting a trip signal when a load current detected by the current detecting circuit exceeds a predetermined value, and a hold circuit for stopping the operation of the driving circuit when the response circuit outputs the trip signal.

4 Claims, 1 Drawing Sheet

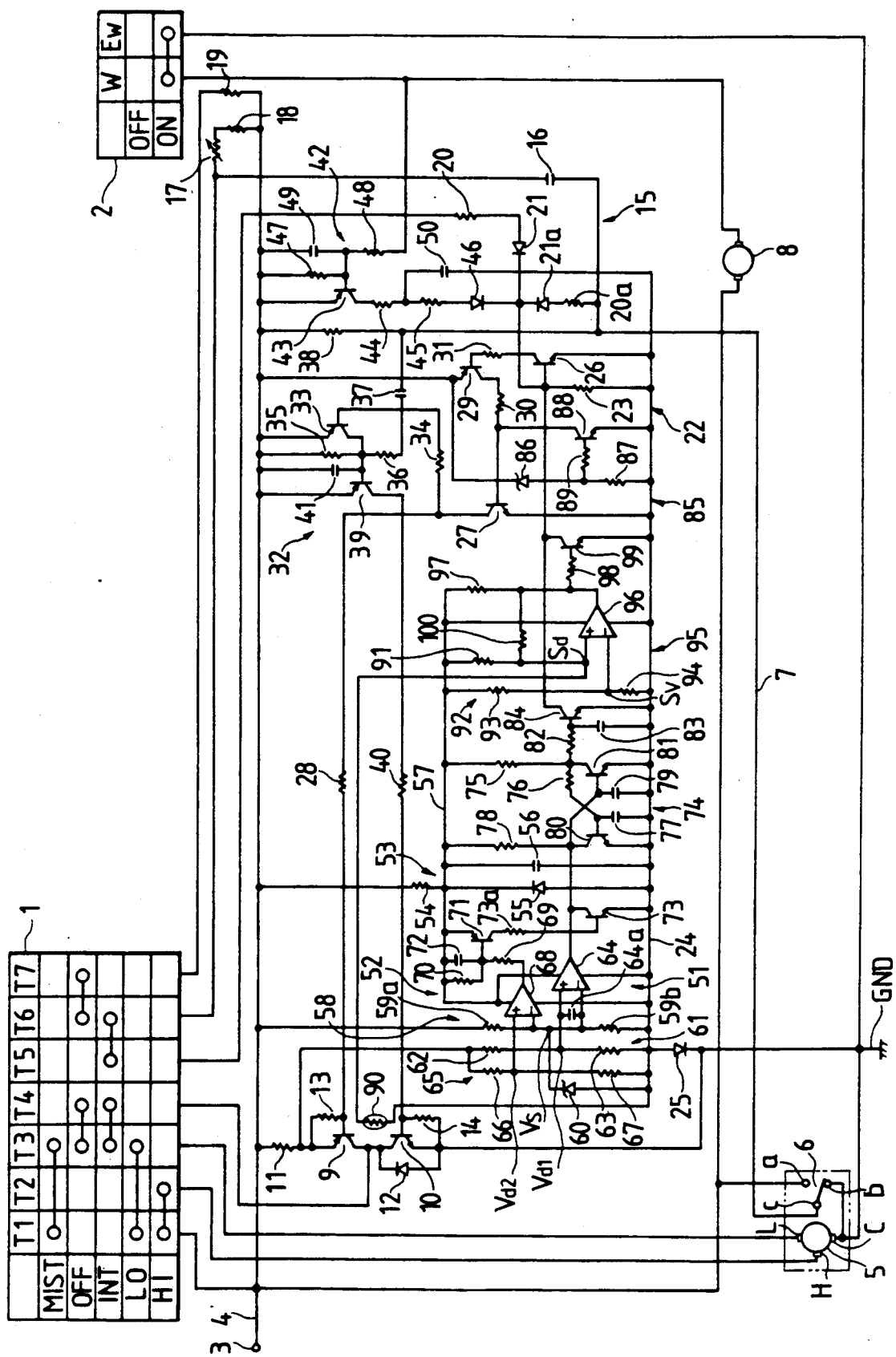

WIPER CONTROL DEVICE

BACKGROUND OF THE INVENTION

This invention relates to wiper control devices for automobiles or the like, and more particularly to a wiper control device for allowing a wiper to perform an intermitting wiping operation.

In general, a wiper control device for an automobile, for instance, has a continuous wiping mode for driving the wiper continuously, and an intermittent wiping mode for driving the wiper intermittently. In the intermittent wiping mode, a relay switch provided in a wiper motor powering path is turned on and off periodically by an interval control circuit.

In the above-described conventional wiper control device, the relay switch with mechanical contacts is employed as a switching element for driving the wiper motor. Therefore, the sounds generated when the relay switch is turned on and off are relatively noisy.

In order to overcome these difficulties, similarly as in the case of the internal control circuit made up of solid state elements, it is desirable to use solid state elements to form the wiper motor driving switching element; that is, instead of the relay switch, a semiconductor switching element such as a power transistor should be employed. However, in this connection, it should be noted that in general a semiconductor switching element is liable to be broken by overcurrent, whereas, in an automobile, short-circuit current due to dead short or overcurrent due to the locking of the wiper motor would be caused. Hence, it is not practical to merely use solid state elements to form the wiper motor driving switching element. Furthermore, a semiconductor switching element is liable to be broken when thermal runaway occurs with it to abnormally increase its temperature. This difficulty may be eliminated by the following method: The actual temperature o of the semiconductor switching element is compared with a predetermined upper limit temperature, and the semiconductor switching element is forcibly turned off according to the result of the comparison. However, the method is still disadvantageous in the following point: If the semiconductor switching element is forcibly turned off merely according to the result of comparison, then chattering occurs with the semiconductor switching element.

The relay switch may be of a change-over type having make and break contacts. Therefore, in dynamically braking the wiper motor to positively stop the wiper at a predetermined position, the break contact can be utilized as it is. However, for the above-described utilization of solid state elements, it is necessary to additionally provide a semiconductor switching element for dynamically braking the wiper motor. Furthermore, if the semiconductor switching element for driving the wiper motor and the semiconductor switching element for dynamically braking it are merely combined with each other, then they may be turned on at the same time, thus short-circuiting the power source. Hence, it is rather difficult to use solid state elements to form the wiper motor driving switching element.

SUMMARY OF THE INVENTION

In view of the foregoing, an object of this invention is to provide a wiper control device in which semiconductor switching elements are utilized for intermittently driving a wiper motor, whereby the sounds generated when the relay switch is turned on and off are eliminated and the semiconductor switching element is positively protected from overcurrent and abnormal temperature rise, and the wiper can be positively stopped at a predetermined position, and in which the semiconductor switching elements is prevented from chattering when protected in the above-described manner.

The foregoing object of the invention has been achieved by the provision of a wiper control device comprising: a wiper switch having a continuous mode position, a stop mode position, and an intermittent mode position for allowing a wiper to perform an intermittent wiping operation; and a predetermined position stop switch which is placed in a detection state when the wiper is moved to a predetermined standby position; which, according to the invention, comprises: a main semiconductor switching element which, when the wiper switch is set to the intermittent mode position, is inserted to a powering path provided for a wiper motor; a drive circuit which, when the wiper switch is set in the intermittent mode position, is caused to operate periodically by an interval control circuit, and holds an operation thereof for each period until the predetermined position stop switch is placed in a detection state, and which turns on the main semiconductor switching element when in operation; an auxiliary semiconductor switching element which, when the operation of the drive circuit is suspended, is turned on to short-circuit both terminals of the wiper motor; current detecting means for detecting a load current flowing in the main semiconductor switching element; a response circuit for outputting a trip signal when a load current detected by the current detecting means exceeds a predetermined value; a hold circuit for holding the operation of the drive circuit stopped when the response means outputs the trip signal; a temperature sensor for detecting a temperature of the main semiconductor switching element; a comparison circuit for comparing the detection signal provided by the temperature sensor with a reference voltage signal corresponding to a predetermined upper limit temperature, and for suspending the operation of the drive circuit when the temperature detected exceeds the upper limit temperature; and a hysteresis circuit for allowing the comparison circuit to perform a comparison operation in a hysteresis mode.

BRIEF DESCRIPTION OF THE DRAWING

The sole figure circuit diagram showing the arrangement of one embodiment of this invention.

DETAILED DESCRIPTION OF THE PREFERRED EMBODIMENTS

One embodiment of this invention, an automobile wiper control device, will be described with reference to the figure.

When the wiper switch is set to the intermittent wiping mode position, the main semiconductor switching element is inserted in the wiper motor powering path, and the drive circuit is operated periodically by the interval control circuit and the main semiconductor switching element is turned on when the drive circuit is, in operation. As a result, current is periodically applied to the wiper motor periodically through the main semiconductor switching element. The drive circuit is held in operating condition only until the predetermined position stop switch is placed in a detecting states i.e., until the wiper is moved to a predetermined standby position. Accordingly, when the wiper is moved to the standby position by the wiper motor, the application of current to the wiper motor is interrupted when the main semiconductor switching element is turned off in response to the suspension of the operation of the drive circuit. When the main semiconductor switching element is turned off in this manner, the auxiliary semiconductor switching element is turned on to short circuit the two terminals of the wiper motor. As a result, the wiper motor is dynamically braked, so that the wiper is accurately stopped at the standby position. Thus, the intermittent wiping operation is carried out with the period set by the interval control circuit.

In the case where, during energization of the wiper motor, dead short occurs with the wiper motor grounding the power terminal thereof, or overcurrent accompanies the locking of the wiper motor, the load current flowing in the main semiconductor switching element increases. When the load current detected by the current detecting means exceeds a predetermined value, the response circuit outputs the trip signal, so that the stop circuit operates to hold the operation of the drive circuit. As a result, the main semiconductor switching element is forcibly turned off, whereby it is protected from breakdown due to the overcurrent.

In the case where, during energization of the wiper motor, the temperature of the main semiconductor switching element rises higher than a predetermined upper limit temperature, the comparison circuit compares the detection signal outputted by the temperature sensor with a reference voltage signal corresponding to the upper limit temperature, and stops the drive circuit according to the result of the comparison. As a result, the main semiconductor switching element is forcibly turned off. That is, the main semiconductor switching element is protected from breakdown due to the abnormal temperature rise. In this case, the hysteresis circuit allows the comparison circuit to perform the comparison operation in a hysteresis mode, thus eliminating chattering that occurs with the main semiconductor switching element when the temperature detected by the temperature sensor is around the upper limit temperature.

In the Figure, reference numeral 1 designates a wiper switch with terminals T1 through T7. The wiper switch is operated with an operating lever (not shown) to take a stop mode position OFF, a mist mode position MIST, an intermittent mode position INT, and continuous modes, namely, a low mode position LO and a high mode position HI. When the wiper switch 1 is operated to take the positions OFF, MIST, INT, LO and HI, the terminals T1 through T7 are connected selectively as shown in the Figure. The wiper switch 1 is designed so that, when the wiper switch 1 is operated to take any one of the to mode position OFF, the intermittent position INT, the low mode position LO and the high mode position HI, the switching conditions are latched, and the wiper switch 1 is allowed to take the mist mode position MIST only when the wiper operating lever is operated with the switch 1 in the off mode position OFF, and the wiper switch 1 is automatically set to the off mode position OFF again when the operating lever is released.

Further in the Figure, reference numeral 2 designates a washer switch 2 with terminals W and Ew. The washer switch is normally in an off position OFF with the terminals W and Ew disconnected. Only when its operating knob (not shown) is operated, is the washer switch 2 set to an on position ON with the terminals W and We connected. The terminal Ew of the washer switch 2 is connected to a ground line GND.

Further in the Figure, reference numeral 3 designates a the power terminal connected through an ignition switch to a battery on a vehicle (not shown). A power line 4 is connected to the power terminal 3. and to the terminal T1 of the wiper switch 1. A wiper motor 5 for operating a windshield wiper (not shown) comprises a common terminal C, a high speed rotation terminal H, and a low speed rotation terminal L. The wiper motor 5 is rotated at a high speed when energized through the high speed rotation terminal H, and it is rotated a low speed when energized through the low speed rotation terminal L. The common terminal C is connected to the ground line GND, and the high speed rotation terminal H and the low speed rotation terminal L are connected to the terminals T2 and T3 of the wiper switch 1, respectively.

Further in the Figure, reference numeral 6 designates a conventional predetermined position stop switch. When the windshield wiper is at a predetermined standby position, the armature of the switch 6 is operated to connect its contacts c and b. That is, the switch 6 is set to a detection position. When the wiper is moved from the predetermined standby position, the armature is tripped to connect the terminals c and a. The contacts a, b and c of the predetermined position stop switch 6 are connected to the power line 4, the ground line GND, and a signal line 7, respectively. Reference numeral 8 designates a pump motor for driving a conventional washer pump on a vehicle to jet window washer solution onto the windshield glass. The pump motor is connected to the power line 4 and the terminal W of the washer switch 2.

Reference numeral 9 designates a main semiconductor switch, namely a first power transistor of pnp type, and reference numeral 10 designates an auxiliary semiconductor switch, namely, a second power transistor of npn type. The collectors of the transistors 9 and 10 are connected to the terminal T4 of the wiper switch 1. The emitter of the first power transistor 9 is connected through current detecting means, namely, a sampling transistor 11 connected to the power line 4, while the emitter of the second power transistor 10 is connected to the ground line GND. A flywheel diode 12 is connected between the collector and emitter of the second power transistor 10 with the polarity as shown. A resistor 13 is connected between the base and emitter of the power transistor and similarly a resistor 14 is connected between the base and emitter of the power transistor 10.

Reference numeral 15 designates an interval control circuit for determining an intermittent wiping period which is designed as follows: Reference numeral 16 designates a timer element, namely, a capacitor the terminals of which are connected to the terminal T6 of the wiper switch 1 and to the signal line 7. Reference numerals 17 and 18 designate a variable resistor and a resistor, respectively, which are combined with the capacitor 16 to form a time constant circuit for determining an intermittent wiping period. The resistors 17 and 18 are series-connected to each other to form a series circuit. One terminal of the series circuit is connected to the power line 4, and the other terminal is connected to the terminal T6 of the wiper switch 1. Reference numeral 19 designates a resistor for charging the capacitor 16 while the wiper switch 1 is in the off mode position OFF. One terminal of the resistor 19 is connected to the power line 4 and the other terminal is connected to the terminal T7 of the wiper switch 1. Reference numeral 20 designates a resistor for discharging the capacitor 16. One terminal of the resistor 20 is connected to the terminal T5 of the wiper switch 1, and the other terminal is connected to an auxiliary ground line 24 through a diode 21 set in a forward biased direction and a resistor 23 in a drive circuit 22. The auxiliary ground line 24 is connected to the ground line GND through a diode 25 set in a forward biased direction. The signal line 7 is connected to the cathode of the diode 21 through a series circuit comprising resistor 20a and a diode 21a as shown.

The drive circuit 22 turns on the first power transistor 9, and is designed as follows:

The drive circuit 22 has an npn type transistor 26 in the input stage. The emitter of the transistor 26 is connected to the auxiliary ground line 24. The aforementioned resistor 23 is connected between the base and emitter of the transistor 26. Reference numeral 27 designates an npn type transistor in the output stage. The collector of the transistor 27 is connected through a resistor 28 to the base of the first power transistor 9, and the emitter is connected to the auxiliary ground line 24. Reference numeral 29 designates a pnp type transistor in the intermediate stage. The emitter of the transistor 29 is connected to the power line 4, and the collector is connected through a resistor 30 to the base of the transistor 27. The base of the transistor 29 is connected through a resistor 31 to the collector of the transistor 26 in the input stage.

Reference numeral 32 designates a braking control circuit which turns on the second power transistor 10. The circuit 32 is designed as follows: Reference numeral 33 designates a pnp type transistor in the input stage. The base of the transistor 33 is connected through a resistor 34 to the collector of the transistor 27 in the drive circuit 26. The emitter of the transistor 33 is connected to the power line 4, and the collector is connected to the common connecting point of resistors 35 and 36 forming a series circuit. One terminal of the series circuit of the resistors 35 and 36 is connected to the power line 4, and the other terminal is connected through a capacitor 37 to the signal line 7. A resistor 38 is connected between the power line 4 and the signal line 7. Reference numeral 39 designates a pnp type transistor in the output stage. The emitter of the transistor 39 is connected to the power line 4, and the collector is connected through a resistor 40 to the base of the second power transistor 10. The base of the transistor 39 is connected to the collector of the transistor 33. A capacitor 41 is connected between the base and emitter of the transistor 39.

Reference numeral 42 designates a washer interlocking circuit for driving the washer in association with the "on" operation of the washer switch 2. The circuit 42 is designed as follows: Reference numeral 43 designates a pnp type transistor. The emitter of the transistor 43 is connected to the power line 4, and the collector is connected through a series circuit of resistors 44 and 45 and a diode 46 set in a biased forward direction to the base of the transistor 26 in the drive circuit 22. A resistor 47 is connected between the base and emitter of the transistor 43. The base of the transistor 43 is connected through a resistor 48 to the terminal W of the washer switch 2. Reference numeral 49 designates a capacitor for delaying the interlocking operation of the windshield wiper. One terminal of the capacitor 49 is connected to the power line 4, and the other terminal is connected to the base of the transistor 43. Reference numeral 50 designates a capacitor for obtaining an operating time when the wiper is interlocked. One terminal of the capacitor 50 is connected to the common connecting point of the resistors 44 and 45, and the other terminal is connected to the auxiliary ground line 24.

Reference numerals 51 and 52 designate first and second response circuits for comparing a voltage across the sampling resistor 11 with different reference voltages. These circuits are designed as follows:

First, elements common to the first and second response circuits 51 and 52 will be described. Reference numeral 53 designates a voltage stabilizing circuit. A series circuit of a resistor 54 and a constant voltage diode 55 with the polarity as shown is connected between the power line 4 and the auxiliary ground line 24. The constant voltage diode 55 is shunted by a capacitor 56. The cathode of the constant voltage diode 55 is connected to an auxiliary power line 57. Reference numeral 58 designates a reference voltage generating circuit. The circuit 58 comprises a series circuit of resistors 59a and 59b connected between the power line 4 and the auxiliary ground line 24, and a constant voltage diode 60 which is connected in parallel to the resistor 59b with the polarity as shown in the figure. A reference voltage Vs is provided at the cathode of the constant voltage generating circuit 60.

The first response circuit 51 includes a first detection voltage generating circuit 61. The circuit 61 comprises a series circuit of resistors 62 and 63 which is connected between the auxiliary ground line 24 and the load terminal of the sampling resistor 11 (corresponding to the emitter of the first power transistor 9). A first detection voltage Vd1 is provided at the common connecting point. Reference numeral 64 designates a comparator which is energized through the auxiliary power line 57. The aforementioned reference voltage Vs is applied to the inversion input terminal (−) of the comparator 64, and the detection voltage Vd1 is applied to the non-inversion input terminal (+) of the comparator 64. The first detection voltage Vd1 is decreased as the detection load current of the sampling resistor 11 increases. In this connection, the resistances of the resistors 62 and 63 are selected such that Vd1 Vs is established when the load current exceeds a first upper limit $I_1$. In steady state, Vd1≧Vs, and therefore the comparator 64 outputs a high level signal. When the detection load current of the sampling resistor 11 exceeds the first upper limit $I_1$, the state of the comparator is changed; that is, the comparator 64 outputs a low level signal as a first trip signal St1. The first upper limit $I_1$ is determined such that it is larger than the start current of the wiper motor 5 and smaller than the short-circuit current thereof. A capacitor 64a is connected between the two input terminals of the comparator 64.

The second response circuit 52 comprises a second detection voltage generating circuit 65. The circuit 65 includes a series circuit of resistors 66 and 67 which is connected between the auxiliary ground line 24 and the load terminal of the sampling resistor 11. A second detection voltage Vd2 is provided at the common connecting point of the resistors. The second response circuit 52 further comprises a comparator 68 which is energized through the auxiliary power line 57. The reference voltage Vs is applied to the inversion input terminal (−) of the comparator 68, and the second detection voltage Vd2 is applied to the non-inversion input terminal (+) thereof. The second detection voltage Vd2 is also decreases as the detection load current of the sampling resistor 11 increases. In this connection, the resistances of the resistors 66 and 67 are selected such that Vd2<Vs is established when the load current exceeds a second upper limit value $I_2$ which is lower than the first upper limit value $I_1$. In steady state, Vd2≧Vs, and therefore the comparator 68 outputs a high level signal. However, when the detection load current of the sampling resistor 11 exceeds the second upper limit $I_2$, the state of the comparator is changed; that is, the comparator 68 outputs a low level signal. The second upper limit $I_2$ is determined such that it is somewhat smaller than the lock current of the wiper motor 5.

In the second response circuit 52, the output terminal of the comparator 68 is connected through resistors 69 and 70 to the auxiliary power line 57. The common connecting point of the resistors 69 and 70 is connected to the base of a pnp type transistor 71. An on-delay capacitor 72 is connected between the base and emitter of the transistor 71. The emitter of the transistor 71 is connected to the auxiliary power line 57, and the collector thereof is connected through a resistor 73a to the base of an npn type transistor 73. Thus, the transistor 71 is turned on when the capacitor 72 is charged to a predetermined value after the comparator 68 outputs the low level signal. That is, when, in the second response circuit 52, the detection load current of the sampling resistor 11 exceeds the second upper limit value $I_2$ and the output of the comparator 68 is changed to the low level signal, the transistor 71 provides a high level signal, namely, a second trip signal St2 at the collector with a predetermined delay time.

The above-described transistor 73 is a part of a hold circuit 74 including an R-S flip-flop. The hold circuit 74 is designed as follows:

In the hold circuit 74, a series circuit of resistors 75 and 76 and a capacitor 77, and a series circuit of a resistor 78 and a capacitor 79 are connected between the auxiliary power line 57 and the auxiliary ground line 24. The common connecting point of the resistor 76 and the capacitor 77 is connected to the base of an npn type transistor 80. The common connecting point of the resistor 78 and the capacitor 79 is connected to the base of an npn type transistor 81. The collector and emitter of the transistor 80 are connected to the collector and emitter of the aforementioned transistor 73, respectively. These collectors are connected to the output terminal of the comparator 64, and these emitters are connected to the auxiliary ground line 24. The collector of the transistor 81 is connected to the common connecting point of the resistors 75 and 76, and the emitter thereof is connected to the auxiliary ground line 24.

A series circuit of a resistor 82 and a capacitor 83 is connected between the collector and emitter of the transistor 81. The common connecting point of the resistor 81 and a capacitor 83 is connected to the base of an npn type transistor 84 in the output stage. The collector of the transistor 84 is connected to the base of the transistor 26 in the drive circuit 22, and the emitter thereof is connected to the auxiliary ground line 24.

In the hold circuit 74 thus arranged, the transistors 80 and 81 form a flip-flop circuit. The flip-flop circuit is placed in a set state when the transistor 80 is turned on, and is placed in a reset state when the transistor 81 is turned on. In this case, the time constant $\tau_1$ of a charging circuit comprising the resistors 75, 76 and the capacitor 77, and the time constant $\tau_2$ of a charging circuit comprising the resistor 78 and the capacitor 79 are determined, so as to meet the following condition:

$$\tau_1 > \tau_2$$

Therefore, a power-on-reset function is obtained such that, when voltage is applied to the auxiliary power line by operating the power switch, the transistor 81 is turned on while the transistor 80 is turned off.

Further in the Figure, reference numeral 85 designates a serge protection circuit for over-voltage protection of the first power transistor 9. The serge protection circuit 85 is designed as follows: Reference numeral 86 designates an over-voltage detecting constant voltage diode. The cathode of the diode 85 is connected to the power line 4, while the anode thereof is connected through a protective resistor 87 to the auxiliary ground line 24 so that breakdown occurs with the diode 85 when an over-voltage higher than a predetermined level is applied to the power line 4. Reference numeral 88 designates an npn transistor the base of which is connected through a resistor 89 to the anode of a constant voltage diode 86. The collector of the transistor 88 is connected to the base of the transistor 27 in the drive circuit 22, and the emitter is connected to the auxiliary ground line 24.

Further in the Figure, reference numeral 90 designates a temperature sensor, namely, a position (positive characteristic thermistor) for detection of the temperature of the first power transistor 9. One terminal of the position 90 is connected through a resistor 91 to the auxiliary power line 57, and the other terminal is connected to the auxiliary ground line 24. Thus, a detection signal Sd having a voltage level corresponding to a temperature detected by the position 90 is provided at the common connecting point of the position 90 and the resistor 91. Reference numeral 92 designates a reference voltage generating circuit. The circuit 92 includes a series circuit of resistors 93 and 94 which is connected between the auxiliary power line 57 and the auxiliary ground line 24. A reference voltage signal Sv corresponding to a predetermined upper limit temperature is provided at the common connecting point of the resistors 93 and 94.

Further in the Figure, reference numeral 95 designates a comparison circuit. The comparison circuit 95 is designed as follows: Reference numeral 96 designates a comparator which is energized through the auxiliary power line 57. The above-described detection signal Sd and reference voltage signal Sv are applied to the non-inversion input terminal (+) and the inversion input terminal (−) of the comparator 96, respectively. The output terminal of the comparator 96 is connected through a resistor 97 to the auxiliary power line 57, and through a resistor 98 to the base of an npn type transistor 99. A resistor 100 is connected between the output terminal and the non-inversion input terminal (+) of the comparator 96. The resistor 100 forms a conventional hysteresis circuit for allowing the comparator to perform comparison in a hysteresis mode. The collector of the above-described transistor 99 is connected to the base of the transistor 26 in the drive circuit 22, and the emitter thereof is connected to the auxiliary ground line 24.

Hence, in the comparison circuit 95, when the detection signal Sd is smaller than the reference voltage signal Sv (Sd<Sv); that is, the when temperature detected by the position 90 is lower than the predetermined upper limit value as in the normal condition, the comparator 96 outputs a low level signal to turn off the transistor 99. When Sd≧Sv; that is, when the temperature detected by the position 90 is not lower than the predetermined value, the comparator 96 provides a high level signal to turn on the transistor 99.

The operation of the wiper control circuit thus organized will now be described.

In the initial state that the circuit is electrically energized in response to the operation of the ignition switch (not shown), voltage is applied to the power line 4 from a battery (not shown). If, in this case, the voltage applied to the power line 4 is in a normal range, no breakdown occurs with the constant voltage diode 86 in the serge protection circuit 85, and accordingly the transistor 88 is held non-conductive. In the normal condition that the wiper is at the predetermined standby position, in the predetermined position stop switch 6, the contacts b and c are connected through the armature. When the wiper switch 1 is set to the stop mode position OFF, the capacitor 16 in the interval control circuit 15 is electrically connected to the power line 4, so that it is charged through the resistor 19, the terminals T7 and T6 of the wiper switch 1, and the contacts (b-c) of the predetermined position stop switch 6. When the power switch is turned on, in the hold circuit 74, its power-on-reset function is effected. As a result, the hold circuit 74 is placed in the reset state; that is, the transistor 81 is turned on while the transistor 80 is turned off, and accordingly the transistor 84 in the output stage is held turned off. When, under this condition, the wiper switch 1 or the washer switch 2 is operated and the following operation is carried out:

(I) When the wiper switch 1 is set to the intermittent mode position INT:

In the wiper switch 1, the terminals T3 and T4 are connected, and the terminals T5 and T6 are connected. Therefore, owing to the terminal voltage of the capacitor 16 in the interval control circuit 15 which has been charged, the base potential of the transistor 26 in the drive circuit 22 is immediately raised through the terminals T6 and T5, the resistor 20, the diode 21 and the resistor 23, as a result of which the transistor 26 is turned on. Hence, in the drive circuit 22, the transistors 29 and 27 are turned on successively, whereby the first poWer transistor 9, and the transistor 33 in the braking control circuit 32 are turned on.

When the first power transistor 9 is turned on as described above, a powering path is formed which extends from the power line 4 through the sampling resistor 11, the first power transistor 9, the terminals T4 and T4 of the wiper switch 1, and the low speed rotation terminal L and the common terminal C of the wiper motor 5 to the ground line GND, so that the wiper motor 5 is rotated at relatively low speed. That is, the wiper starts to wipe the windshield glass, and in the predetermined position stop switch 6, the armature is tripped over to the contact a (the contacts c and a are connected through the armature).

In the braking control circuit 32, when the transistor 33 is turned on as described above, the transistor 39 is maintained turned off, which prevents the short circuit of the power source which is caused by carelessly turning on the second power transistor 10 with the first power transistor 9 turned on.

When the contacts c and a of the predetermined position stop switch 6 are connected through the armature as was described above, the signal line 7 is connected through the contacts c and a to the power line 4, so that the capacitor 16 is discharged, while the transistor 26 in the drive circuit 22 is held turned on by the voltage signal which is given by the signal line 7 through the resistor 20a and the diode 21a. Accordingly, the first power transistor 9 and the transistor 33 are maintained turned on, so that current is continuously applied to the wiper motor 5. In response to the continuous application of current to the wiper motor, the wiper is returned to the standby position, and the armature of the predetermined position stop switch 6 is tripped over to the contact b (the contacts c and b being connected through the armature) again. In this operation, since the capacitor 16 has been discharged, the transistor 26 is turned off. As a result, in the drive circuit 22, the transistors 29 and 27 are turned off successively, and therefore the first power transistor 9 is turned off, so that the wiper motor 5 is also turned off.

When the first power transistor 9 is turned off in association with the off-operation of the transistor 27, in the braking control circuit 32, the transistor 39 is turned on in response to the off-operation of the transistor 33, so that the second power transistor 10 is turned on. As a result, the low speed rotation terminal L and the common terminal C of the wiper motor 5 are shorted through the terminals T3 and T4 of the wiper switch 1 and the second power transistor 10, whereby the wiper motor 5 is subjected to dynamic-braking, so that the wiper is positively stopped at the standby position. In this case, the surge voltage accompanying the off-operation of the first power transistor 9 is absorbed by the on-operation of the second power transistor 10, so that the first power transistor 9 is prevented from voltage breakdown.

When the predetermined position stop switch 6 is restored in such a manner that the contacts c and b are connected through the armature, in the interval control circuit 15 the capacitor 16 is electrically connected to the power line 4; that is, it is charged through the resistor 18, the variable resistor 17 and the contacts c and b of the switch 6. When the terminal voltage of the capacitor 16 is raised to a predetermined level by charging, the transistor 26 in the drive circuit 22 is turned on again. Thereafter, in response to the on and off operations of the wiper motor, the wiper is repeatedly operated to perform its wiping operation and to stop at the standby position; that is, the intermittent wiping operation is carried out. The period of the intermittent wiping operation is determined from the time constant of the capacitor 16, the variable resistor 17 and the resistor 18, and therefore it can be adjusted with the variable resistor 17.

When, during the wiper's wiping operation in which the contacts c and a of the predetermined position stop switch 6 are connected through the armature, the wiper switch 1 is set to the stop mode position OFF, the first power transistor 9 is held turned on because the contacts c and a are short-circuited as was described above. Thus, current is continuously supplied to the wiper motor 5. When, thereafter, the armature of the predetermined position stop switch 6 is tripped to short-circuit the contacts c and b, the second power transistor 10 is turned on as was described before. In this case, even if the wiper switch 1 is set to the off mode position OFF, the terminals T3 and T4 are held short-circuited. Therefore, in response to the on-operation of the second power transistor 10, the wiper motor 5 is dynamically braked, so that the wiper is positively stopped at the standby position. When, while the wiper is held at the standby position, i.e., the contacts c and b of the predetermined position stop switch 6 are short-circuited, the wiper switch 1 is set to the stop mode position OFF, the wiper motor 5 is dynamically braked in the same manner, and it is placed in the initial state.

(II) When the wiper switch 1 is set to the load mode position LO:

In this case, the terminals T1 and T3 in the wiper switch 1 are connected to one another. As a result, a powering path is formed which extends from the power line 4 through the terminals T1 and T3, and the low speed rotation terminal L and the common terminal C of the wiper motor 5 to the ground line GND. Hence, the wiper motor 5 is driven at relatively low speed; that is, a low speed wiping operation is carried out. When the wiper switch 1 is set to the stop mode position OFF during the wiping operation, the terminals c and a of the predetermined position stop switch 6 are short-circuited, as a result of which, the first power transistor 9 is held on similarly as in the above-described case, and current is continuously supplied to the wiper motor 5. When the predetermined position stop switch 6 is restored to short-circuit the terminals c and b, the second power transistor 10 is turned on, and the wiper motor 5 is dynamically braked. As a result, the wiper is positively held at the standby position. In the case when the wiper switch 1 is set to the stop mode OFF with the wiper at the standby position, the wiper motor is dynamically braked in the same manner.

(III) When the wiper switch 1 is set to the high mode position HI:

In this case, the terminals T1 and T2 of the wiper switch 1 are connected to each other, as a result of which a powering path is formed which extends from the power line 4 through the terminals T1 and T2, and the high speed rotation terminal H and the common terminal C of the wiper motor 5 to the ground line GND. Hence, the wiper motor 5 is rotated at relatively high speed; that is, a high speed wiping operation is carried out. When, thereafter, the wiper switch 1 is set to the stop mode position OFF, similarly as in the case of the above-described paragraph (II) current is continuously supplied to the wiper motor 5 until the wiper returns to the standby position, and then the wiper motor 5 is dynamically braked, so that the wiper is positively stopped at the standby position.

(IV) When the wiper switch 1 is set to the mist mode position MIST:

The wiper switch is generally set to the mist mode position for a short period of time. That is, the terminals T1 and T3 of the wiper switch 1 are connected to each other for a short period of time. Hence, the wiper motor 5 is dynamically braked similarly as in the above-described paragraph (II). Accordingly, the low speed wiping operation is carried out once (it may be carried out more than once when the wiper switch is held set to the mist mode position MIST for a relatively long period of time), and upon completion of the low speed wiping operation the wiper is stopped positively at the standby position.

(V) When the washer switch 2 is turned on:

Simultaneously when the washer switch 2 is turned on, current is applied to the pump motor 8 through the terminals W and Ew. As a result, the washer pump (not shown) is driven to jet the window washer solution to the windshield glass. In the washer interlocking circuit 42, the transistor 43 is turned on with a predetermined delay time due to the charging of the capacitor 49. As a result, the capacitor 50 is charged, and in the drive circuit 22 the transistors 26, 29 and 27 are turned on successively, whereby the first power transistor 9 is turned on.

In this operation, the wiper switch 1 is in the stop mode position OFF, and the terminals T3 and T4 are short-circuited. Hence, current is applied to the wiper motor 5 through the first power transistor 9 and the terminals T3 and T4. Thereupon, the wiping operation is started in association with the driving of the washer pump.

When, thereafter, the washer switch 2 is turned off, the application of current to the pump motor 8 is discontinued, so that the jetting of the window washer solution is suspended, while the transistor 43 is turned off. When the transistor 43 is turned off in this manner, the capacitor 50 is discharged through the resistor 45, the diode 46 and the resistor 23. The transistor 26 in the drive circuit 22 is held on until the terminal voltage of the resistor 23 is decreased to a predetermined level. Hence, the first power transistor 9 is maintained on for a predetermined period of time after the washer switch 2 is turned off, so that the wiping operation is carried out a plurality of times even after the jetting of window washer solution has been suspended. In this case also, the wiper motor 5 is dynamically braked by the braking control circuit 32 so that the wiper stops at the standby position.

The wiper motor 5 and the pump motor 8 are selectively driven in the above-described manner. Now, the function of protecting the first power transistor 9 from breakdown will be described.

When, under the condition that the powering path is formed for the wiper motor 5 by the first power transistor 9, dead short occurs grounding the power terminal (low speed rotation terminal H or high speed rotation terminal H) of the wiper motor 5, large short-circuit current flows in the first power transistor 9 through the sampling resistor 11 etc. The short-circuit current is larger than the first upper limit value $I_1$ set by the first response circuit 51. Hence, the first response circuit 51 outputs the first trip signal St1 (low level signal) immediately when the detection load current of the sampling resistor 11 exceeds the first upper limit value $I_1$ (when the first detection voltage Vd1 provided by the first voltage generating circuit 61 becomes lower than the reference voltage Vs provided by the reference voltage generating circuit 58).

As a result, in the hold circuit 74, in response to the first trip signal St1, the capacitor 79 is discharged to turn off the transistor 81, whereby the transistors 80 and 84 are turned on; that is, the reset state is changed to the set state. When the transistor 84 is turned on in this manner, and the drive circuit 22 is kept in off state with the transistors 26, 29 and 27 turned off successively, as a result of which the first power transistor 9 is forcibly turned off. In summary when the short-circuit current flows in the first power transistor 9, the latter 9 is turned off immediately, and is kept turned off. Thus, the first power transistor 9 is protected from the breakdown due to the short-circuit current.

The set state of the hold circuit 74 can be changed to the reset state by the method in which the cause for the short-circuit is removed, and then the power switch is turned on again.

In the case where, under the condition that the powering path for the wiper motor 5 is formed by the first power transistor 9, the wiper motor 5 is locked, large lock current flows in the first power transistor 9 through the sampling resistor 11, etc. The lock current is larger than the second upper limit value I₂ set by the second response circuit 52. Therefore, the second response circuit 52 outputs the second trip signal St2 (high level signal) with a predetermined time delay which is due to the charging of the capacitor 72 after the detection load current of the sampling resistor 11 exceeds the second upper limit value I₂ (the second detection voltage Vd2 provided by the second voltage generating circuit 65 becomes small than the reference voltage Vs).

As a result, in the hold circuit 74, in response to the second trip signal St2, the transistor 373 is turned on and accordingly the transistor 81 is turned off, whereby the transistors 80 and 84 are turned on. Thus, the reset state is changed to the set state. That is, in this case, the drive circuit 22 is placed in off state with the transistors 26, 27 and 29 turned off, and the first power transistor 9 is held forcibly turned off. Thus, the first power transistor 9 is protected form the breakdown due to the over-current.

In this case, the above-described delay time due to the charging of the capacitor 72 is provided. Therefore, even if the detection load current of the sampling resistor 11 exceeds the second upper limit value I₂ because of the start current of the wiper motor 5, the first power transistor 9 will not unnecessarily be turned off. It goes without saying that the set state of the hold circuit 74 can be changed jot the reset state by turning on the power switch again.

When, under the condition that the powering path is formed of the wiper motor 5 by the firs power transistor 9, a voltage higher than the predetermined level is applied to the power line 4, in the serge protection circuit 85 breakdown occurs with the constant voltage diode 86, so that the transistor 88 is turned on. As a result, the drive circuit 22 is placed in an off state with the transistor 27 turned off, and therefore the first power transistor 9 is forcibly turned off. Thus, the first power transistor 9 can be protected from breakdown due to the over-current.

In the case where the temperature of the first power transistor 9 is abnormally increased because of thermal runaway, for instance, whereby the posistor 90 detects a temperature higher than the predetermined value (the detection signal Sd is equal to or larger than the reference voltage signal Sv (SD τ Sv), in the comparison circuit 95 the transistor 99 is turned on. As a result, in the drive circuit 22, the transistors 26, 29 and 27 are turned off successively. Accordingly, the drive circuit 22 is held in an off state, whereby the first power transistor 9 is forcibly turned off. Thus, the firs power transistor 9 is protected from breakdown due to the abnormal temperature rise. In the comparison circuit 95, the resistor 100 allows the comparator 96 to perform a comparison operation in a hysteresis mode. Hence, the first power transistor 9 is prevented from chattering when the positor 909 detects temperatures around the above-described upper limit temperature.

In the above-described embodiment, the main and auxiliary semiconductor switching elements are made up of power transistors. However, instead of thrower transistors, power GTOS (gate turn-off thyristors) may be employed.

As was described above, the wiper control device according to the invention employs semiconductor switching elements for intermittently driving the wiper motor to eliminate sounds generated when the relay switch is turned on and off. Furthermore, the semiconductor switching elements can be positively protected from over-current or abnormal temperature rise. In addition, the semiconductor switching elements are positively prevented form chattering when protected in the above-described manner.

What is claimed is:

1. A wiper control device comprising:
   a wiper motor for driving a wiper, said wiper motor having first and second terminals;
   a wiper switch having a continuous mode position for allowing said wiper to perform a continuous wiping operation, a stop mode position for stopping said wiper, and an intermittent mode position for allowing said wiper to perform an intermittent wiping operation;
   a position stop switching for detecting whether said wiper is placed in a predetermined standby position or not, said stop switch being placed in a detection state when said wiper is moved to said predetermined standby position;
   a driving circuit for suspending an operation thereof for each period until said position stop switch is placed in said detection state;
   a main semiconductor switching element for switching said wiper motor, said switching element being inserted into a powering path provided for said wiper motor when said wiper switch is set in said intermittent mode position;
   an interval control circuit for periodically starting an operation of said driving circuit;
   an auxiliary semiconductor switching element for short-circuiting said first and second terminals of said wiper motor when said operation of said driving circuit is suspended;
   current detecting means for detecting a load current flowing through said main semiconductor switching element;
   a response circuit for outputting a trip signal when the load current detected by said current detecting means exceeds a predetermined value; and
   a hold circuit for suspending said operation of said driving circuit when said response circuit outputs said trip signal.

2. A wiper control device as claimed in claim 1, further comprising:
   temperature detecting means for detecting a temperature of said main semiconductor switching element to output a detection signal having a voltage level corresponding to said detected temperature;
   a comparison circuit for comparing said detection signal provided by said temperature detecting means with a reference voltage signal corresponding to a predetermined upper limit temperature, and suspending said operation of said driving circuit when said detected temperature exceeds said upper limit temperature; and
   a hysteresis circuit for allowing said comparison circuit to perform a comparison operation in a hysteresis mode.

3. A wiper control circuit as claimed in claim 1, wherein said main semiconductor switching element is a pnp type power transistor.

4. A wiper control circuit as claimed in claim 1, wherein said auxiliary semiconductor switching element is an npn type power transistor.

* * * * *

UNITED STATES PATENT AND TRADEMARK OFFICE
CERTIFICATE OF CORRECTION

PATENT NO. : 5,030,899
DATED : July 09, 1991
INVENTOR(S) : YASUSHI NISHIBE ET AL.

It is certified that error appears in the above-identified patent and that said Letters Patent is hereby corrected as shown below:

Claim 1, column 14, line 17, change "switching" to --switch--.

Signed and Sealed this

Thirtieth Day of March, 1993

Attest:

STEPHEN G. KUNIN

Attesting Officer

Acting Commissioner of Patents and Trademarks